United States Patent [19]

Borrelli

[11] 4,295,018
[45] Oct. 13, 1981

[54] ELECTRICAL HOUSING AND SWITCH BOX

[76] Inventor: Dominick Borrelli, 2243 Cropsey Ave., Brooklyn, N.Y. 11214

[21] Appl. No.: 144,386

[22] Filed: Apr. 28, 1980

[51] Int. Cl.³ ............................................. H01R 33/30
[52] U.S. Cl. ............................... 200/51.09; 200/51.12; 200/297; 174/53; 174/59
[58] Field of Search ................. 200/297, 51.09, 51.12, 200/51.11, 51.03; 174/55, 53, 59; 339/191 M, 191 R, 191 A, 192 R, 99 R, 156 R, 122 R, 122 F

[56] References Cited

U.S. PATENT DOCUMENTS 2,908,743 10/1959 Premoshis ............................ 174/59
3,716,651 2/1973 Werner ................................ 174/53
3,858,161 12/1974 Champion et al. ................. 174/53

Primary Examiner—Willis Little
Attorney, Agent, or Firm—Kenneth J. Stempler

[57] ABSTRACT

An electrical housing and switch box are provided, in which the housing is provided with a first opening through which wires are brought to the interior thereof, and a second opening adapted to receive the switch box. A plurality of contacts are mounted in the housing adjacent the second opening. The switch box is provided with a plurality of connectors adapted to slide into and engage with the contacts to provide an operative assembly.

5 Claims, 8 Drawing Figures

ELECTRICAL HOUSING AND SWITCH BOX

SUMMARY OF THE INVENTION

This invention relates to electrical switch receptacles.

Today's common wall switch generally consists of a housing and a small switch box. The housing does little more than isolate the electrical cable from its surroundings, providing an isolated box in which the exposed wires of the cable can be connected to the switch box. Typically, the wires are bared and placed on a screw which is then twisted to secure the wire in place.

Conventional electrical boxes are dangerous to handle, especially for the inexperienced. To avoid serious shock from the exposed wires either during installation or during replacement of a worn out switch box, household current to the involved electrical line should be disconnected.

In addition to the foregoing, construction, requiring new wiring, can be rendered somewhat uneconomic by the high labor cost of individually wiring each switch box to its receptacle. Additionally, rewiring homes and other buildings would require the same labor intensive steps.

In accordance with the present invention, the danger of electrical shock is substantially reduced. Still further, the labor intensive nature of wiring individual switch boxes during construction or rewiring is substantially reduced.

The present invention comprises a housing having an opening through which wires are fed to the interior of the housing. The wires are connected to a plurality of contacts which are in turn positioned adjacent a second opening in the housing.

A switch box, otherwise conventional in nature, is provided with a plurality of connectors equal in number to the number of wires required for the switch to operate. The connectors are preferably free standing lugs, made of metal, which are conventionally wired internally of the switch box.

The housing contacts are provided with means for receiving the connectors as the switch box is slipped into the housing, thus automatically completing the electrical connection to the switch box.

Referring now to the drawings, in which like numerals refer to like parts;

Figure 1:
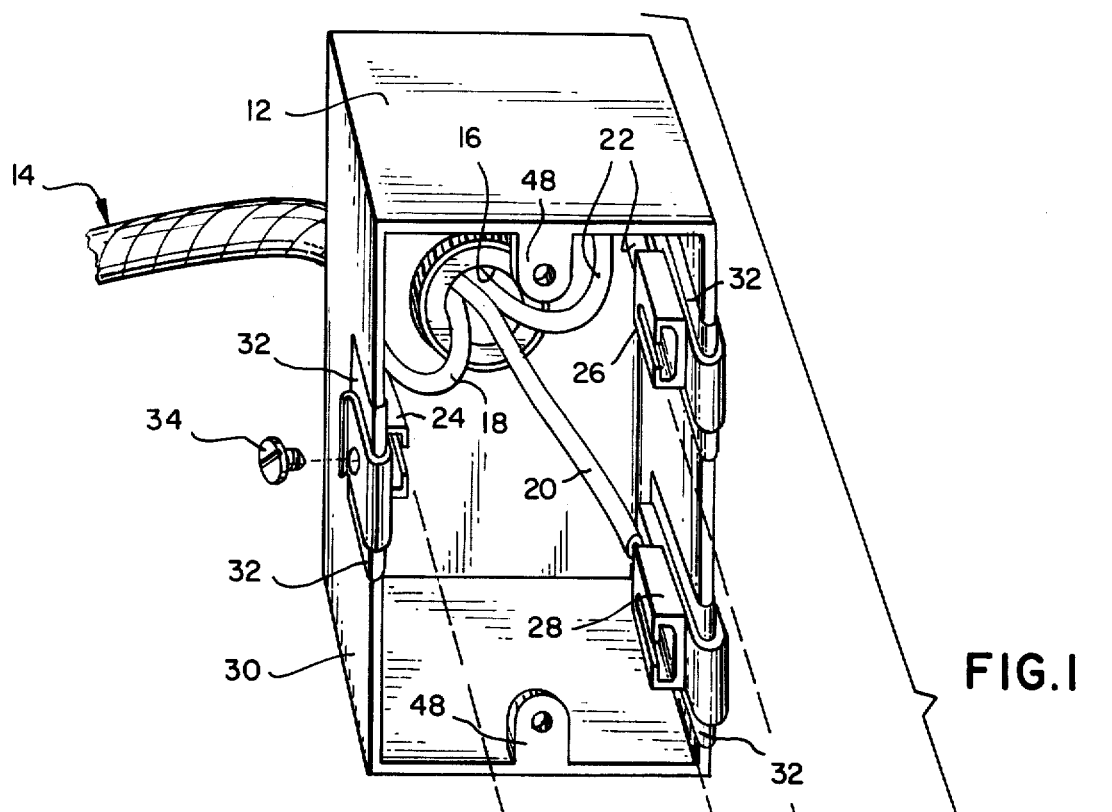
FIG. 1 is an isometric exploded view of the switch box assembly in accordance with the present invention.

Referring to FIG. 1, in which a preferred embodiment is depicted, numeral 10 denotes the switch box and the numeral 12 denotes the housing. As indicated, cable 14, which can be conventional electrical cable used to prewire homes, enters the housing 12 through a first opening 16 in the rear of the housing. The cable generally consists of three wires 18, 20 and 22, which together provide the electrical power to fixed loads (not shown) such as an overhead light, a lamp, etc.

The wires 20 are conventionally bared at their ends and terminated in a contact assembly denoted by the numeral 24.

Figure 2:
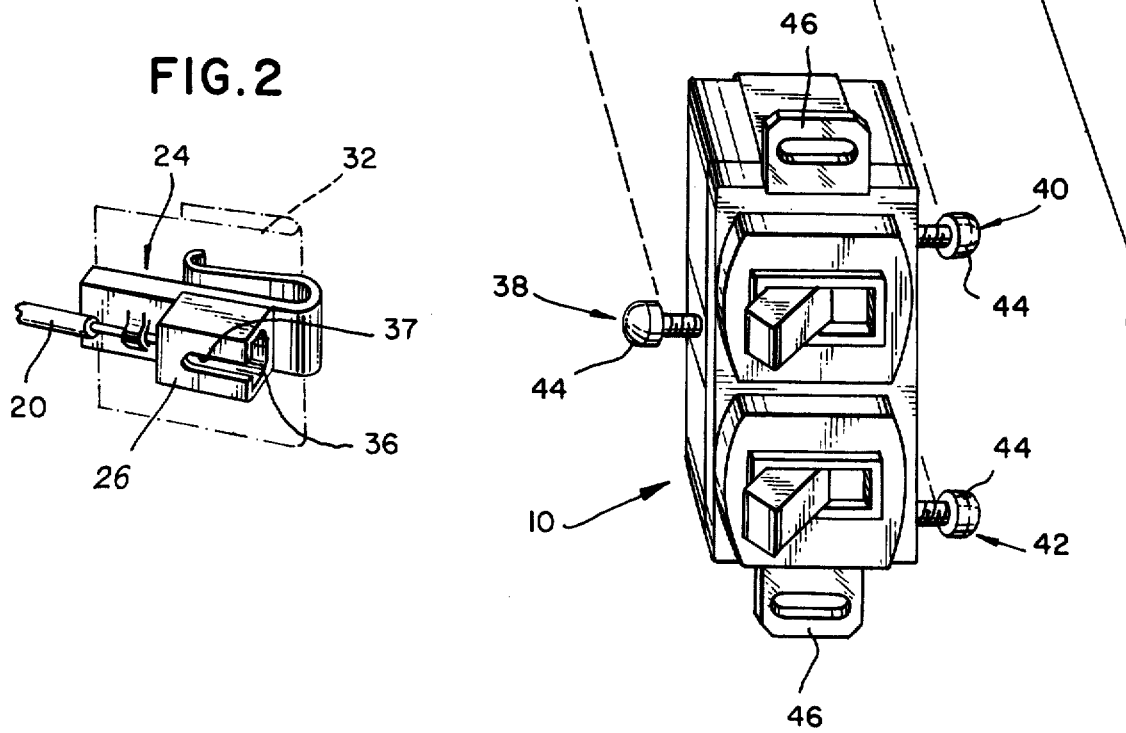
FIGS. 2-8 are detailed views of different connectors useful with the switch box assembly in accordance with the present invention.

Referring more specifically to FIG. 2, the contact 24 comprises contact blocks denoted by the numerals 25, 26 and 28 to which the wire is connected as illustrated in FIG. 2. It is to be understood that conventional methods of connection can be employed if desired.

The contact assembly is mounted on edge 30 of the housing and is separated from the housing by a sheet of plastic or other nonconductive material here denoted by the numeral 32. The contact itself consists of a U-shaped spring-like metallic member which may be slipped over the plastic and, if desired, secured in place by the use of conventional screws 34.

The contact block comprises a rectangular opening denoted by the numeral 36 which communicates with a slot 37, the combination providing a receptacle for co-operating connectors 38, 40 and 42 on switch box 10. Preferably, the connectors 38 are round, hob-nail-like heads which, when slipped into opening 36, will engage the metal of the opening, thus completing the connection to the electric wires.

To complete the assembly, tabs 46 are conventionally provided with switch boxes and adapted to connect to corresponding tabs 48 on the housing which may be provided. Not shown, but also useful, are switch cover plates which are used to cover the second opening.

FIGS. 2-8 illustrate a plurality of contacts which may be employed other than the contact illustrated in FIGS. 1 and 2. The drawings are not meant to be exhaustive of the types of contacts which can be employed, the major consideration being the use of a contact which will permit a connector to be slipped into place to complete the connection to the wires contained in the housing.

Figure 3:
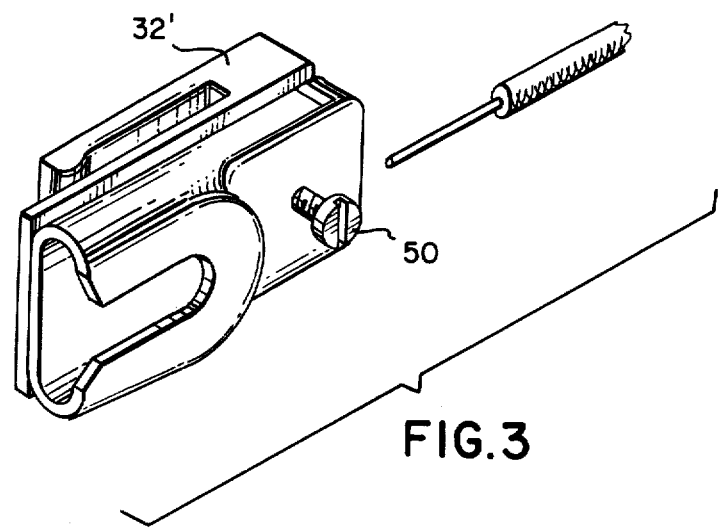

Accordingly, FIG. 3 illustrates a connector in which the U-shaped part, here denoted by the numeral 32', is made entirely of plastic, the metal contacts to which the wire is attached being connected to the plastic directly by a screw or other member 50.

Figure 4:
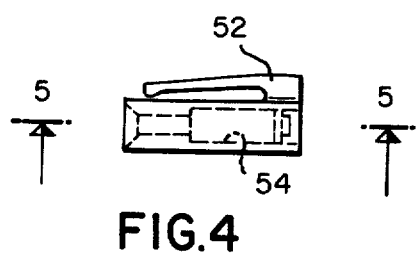

FIG. 4 illustrates a plastic clip 52 similar to the clip 32' illustrated in FIG. 3. However, in this embodiment, the receptacle for the connector is simply a hole within the plastic part which can either be coated with metal or contain a metal sleeve, here denoted by the numeral 54. With this embodiment, the hob nail-like connector would contain a pin directed at right angles to the connector shown in FIG. 1 in order to engage with the metallic sleeve 54.

Figure 5:
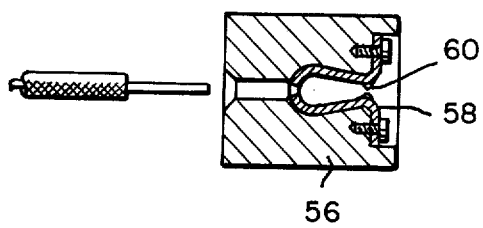

FIG. 5 illustrates a plastic block 56 which can be secured by epoxy or other conventional means to the inside of the housing and which contains the U-shaped metallic sleeve denoted by the numeral 58. As illustrated, the opening is restricted by a pair of protrusions 60 past which the connector, designed in the manner described in connection with FIG. 4, is pushed.

Figure 6:
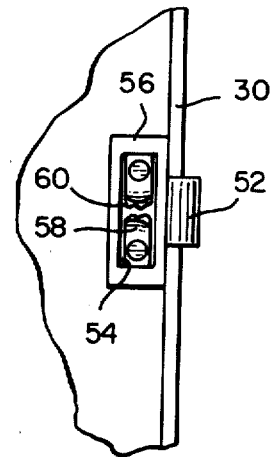

FIG. 6 is a front plan view of the unit of FIG. 5 illustrating the use of a clip 62, integrally molded with the block 56, employed to secure the clip to the housing side wall 30.

Figure 7:
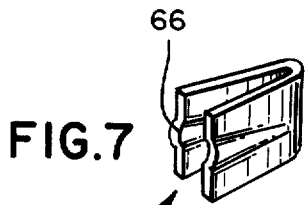

FIG. 7 illustrates a V-type clip made of metal which may be secured inside the wall of the housing, employing plastic to separate the clip electrically from the housing. As illustrated, the connector, designed as described in connection with FIG. 4, would enter in the direction of the arrow 64 and be retained by grooves 66.

Figure 8:
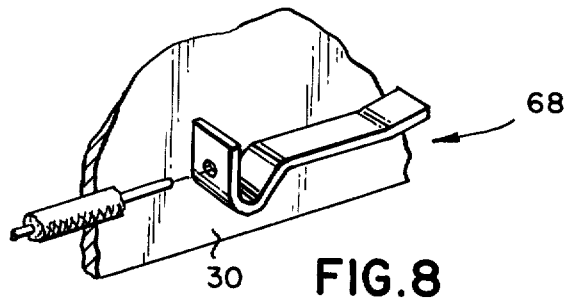

FIG. 8 illustrates a spring clip which can be secured to the inside of the housing, the wire welded to the clip, and the connector, again designed as in FIG. 4, is moved in directly between side wall 30 and the clip. Of course, insulating plastic is employed between the clip and side wall 30.

The assembly described above can be provided as a housing and a switch box in kit form. Once installed and the wires connected to the contacts, the switch boxes can be sold separately as replacement items when and if needed.

The electrical wires can be connected to the contacts either by solder, epoxy, or other conventional means.

Of course, the switch box can be replaced with a plug receptacle box made in the manner described above. The term switch box as used herein is intended to cover plug receptacle boxes as well as switch boxes.

Many modifications will occur to those of ordinary skill in the art. It is intended to cover all such modifications which fall within the scope and spirit of the invention as defined in the claims attached hereto.

What I claim is:

1. An electrical switch assembly comprising a housing having first and second openings therein, and adapted to receive a plurality of electrical wires internally thereof through said first opening, a plurality of electrically conductive contacts mounted on said housing adjacent said second opening, said contacts having means for receiving the said wires, each contact receiving a different one of said wires; a switch box for electrically connecting and disconnecting said wires, said switch box having a plurality of electrical connector means thereon, each of said contacts having a connector receiving opening therein for receiving and partially enclosing one of said connector means when the switch box is pushed into said housing, each connector being shaped to engage said opening.

2. The electrical switch assembly according to claim 1 wherein said contact comprises a clip for mounting said contact to an edge of said housing.

3. The electrical switch assembly according to claim 2 wherein said clip is made of electrically non-conductive plastic and further comprising a metal contact mounted to said plastic clip for receiving the said connector.

4. The electrical switch assembly according to claim 1 wherein said contact comprises a spring-like member for tightly retaining said connector in a contact after assembly has occurred.

5. An electrical switch assembly kit comprising a housing having first and second openings therein, and adapted to receive a plurality of electrical wires internally thereof through said first opening, a plurality of electrically conductive contacts mounted on said housing adjacent said second opening, said contacts having means for receiving the said wires, each contact receiving a different one of said wires; a switch box for electrically connecting and disconnecting said wires, said switch box having a plurality of electrical connector means thereon, each of said contacts having an opening therein for receiving and partially enclosing one of said connector means when the switch box is pushed into said housing, each said connector being shaped to engage said opening.

* * * * *